United States Patent Office 3,317,582
Patented May 2, 1967

3,317,582
DIBENZOCYCLOHEPTENE COMPOUNDS AND
PROCESSES FOR PREPARING THE SAME
Max Tishler, Westfield, N.J., assignor to Merck & Co.,
Inc., Rahway, N.J., a corporation of New Jersey
No Drawing. Filed July 18, 1962, Ser. No. 210,832
8 Claims. (Cl. 260—465)

This invention relates to a process for the production of 5H-dibenzo[a,d]cycloheptenes. In particular, the invention relates to the preparation of 5-(3-hydroxypropyl)-5H-dibenzo[a,d]cycloheptene which is useful as an intermediate in the preparation of 5-(3-methylaminopropyl)-5H-dibenzo[a,d]cycloheptene which is useful in the treatment of mental health conditions as it is an anti-depressant and serves as a mood elevator or a psychic energizer. The invention is also concerned with novel compounds useful in the process and the preparation of such compounds.

In accordance with one aspect of the present invention, 5H-dibenzo[a,d]cycloheptene is reacted with acrylonitrile to form the 3-(5-5H-dibenzo[a,d]cycloheptyl)-propionitrile which is then hydrolyzed to the corresponding propionic acid and the acid reduced to give the desired 5-(3-hydroxypropyl)-5H-dibenzo[a,d]cycloheptene. However, if desired, the propionic acid can be first esterified by reaction with an alkanol and the ester reduced to give the desired carbinol. Alternatively, the propionitrile can be converted to the iminoether which is then hydrolyzed to form the corresponding ester. The ester is then reduced to form the carbinol. The process may be illustrated as follows:

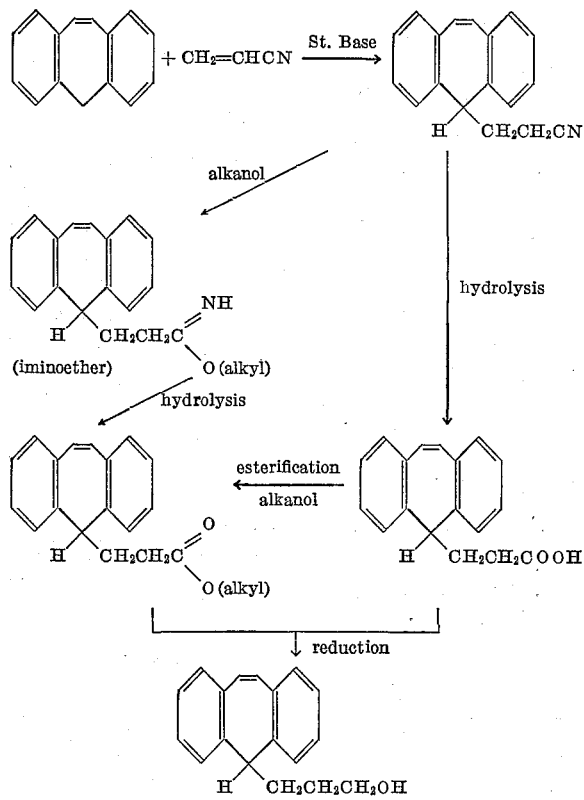

In carrying out the above-described process, the compounds may have substituents on one or both of the benzenoid rings.

The first step of the process involves reacting 5H-dibenzo[a,d]cycloheptene with acrylonitrile in the presence of a strong base, preferably a quaternary ammonium hydroxide such as tetraethylammonium hydroxide and benzyltrimethylammonium hydroxide. The reaction is suitably carried out in the presence of an inert, substantially anhydrous organic solvent, although it may be carried out in the absence of a solvent since the acrylonitrile may be utilized for this purpose. The choice of solvent, when employed, is not critical and a wide variety can be utilized. Representative of these are dioxane, tetrahydrofuran and ethylene glycol dimethyl ether.

The temperature at which the reaction is carried out is not critical. The reaction may be carried out at room temperature or elevated temperatures up to the reflux temperature of the system. Likewise, the ratio of reactants is not critical and equimolar amounts may be used although it is preferred to employ an excess of the nitrile. After completion of the reaction, water may be added to precipitate the product which is then recovered by filtration. Further purification can be achieved by fractional distillation under vacuum.

Hydrolysis of the nitrile to the carboxylic acid may be accomplished in conventional manner under either acidic or basic conditions employing aqueous or alcoholic solutions of potassium hydroxide, sodium hydroxide, hydrochloric acid, acetic acid and the like as the hydrolyzing medium. Preferably, however, the hydrolysis is effected under basic conditions. The product may be recovered employing conventional techniques.

Reduction of the carboxylic acid to the desired carbinol is accomplished employing conventional reducing agents utilized to effect the partial reduction of the carboxylic acid. Suitable agents include lithium aluminumhydride, lithium borohydride and the like. The reduction is carried out in conventional manner employing a suitable inert organic solvent such as tetrahydrofuran and at room or elevated temperatures up to the reflux temperature of the system. Recovery of the carbinol is achieved in conventional manner.

As previously indicated hereinabove, the carboxylic acid may be converted to an ester prior to reduction. This is readily accomplished in conventional manner by reacting the acid with an alkanol under substantially anhydrous conditions and in an acidic medium. After completion of the reaction, water is added and the ester recovered in conventional manner. Reduction of the ester to the desired carbinol may be effected in the same manner as described above for the reduction of the acid.

Preparation of the ester via the iminoether route is readily accomplished by reacting the propionitrile with an alkanol under substantially anhydrous conditions and in an acidic medium. After formation of the iminoether, hydrolysis of the iminoether to the corresponding ester is effected by the addition of water. Recovery of the ester is accomplished in conventional manner.

The following examples are given for purposes of illustrating the present invention and are not to be construed as limiting the invention.

EXAMPLE 1

Preparation of 3-(5-5H-dibenzo[a,d]cycloheptyl)-propionitrile

A solution of 60 g. of acrylonitrile in 50 ml. of dioxane is added dropwise to 85 g. of 5H-dibenzo[a,d]-cycloheptene in 450 ml. of dioxane containing 3 g. tetraethyl ammonium hydroxide. The temperature is maintained between 30 to 40° C. and stirring continued throughout the addition. After standing at room temperature for 6 hours, the reaction mixture is neutralized with hydrochloric acid and water added to precipitate the product, which is then recovered by filtration.

EXAMPLE 2

*Preparation of 3-(5-5H-dibenzo[a,d]cycloheptyl)-propionic acid*

The product of Example 1 is dissolved in 300 ml. of methanol and treated with 75 g. of potassium hydroxide in 75 ml. of water. The resultant solution is refluxed for 6 hours after which time the methanol is removed in vacuo and the aqueous residue diluted with 100 ml. of water and extracted with ether. The aqueous phase is acidified to precipitate the propionic acid compound which is then recovered by filtration.

EXAMPLE 3

*Preparation of the ethyl ester of 3-(5-5H-dibenzo[a,d]-cycloheptyl)-propionic acid from the corresponding acid*

To 1 mole of 3-(5-5H-dibenzo[a,d]cycloheptyl)-propionic acid in 400 ml. of absolute ethanol is added 10 g. of concentrated sulfuric acid and the mixture refluxed for 2 hours. Water is then added and after separation of the layers, the ester layer is recovered. To this is added ether and the mixture washed with water until free of sulfuric acid, then dried with anhydrous magnesium sulfate. Evaporation of the solvent in vacuo yields the desired product which can be purified by distillation under vacuum at 1 mm. pressure.

EXAMPLE 4

*Preparation of the ethyl ester of 3-(5-5H-dibenzo[a,d]-cycloheptyl)-propionic acid via iminoether route*

To 1 mole of 3-(5-5H-dibenzo[a,d]cycloheptyl)-propionitrile in 400 ml. of absolute ethanol is added 1 mole of concentrated sulfuric acid and the mixture refluxed for 2 hours. Water is then added and after separation of the layers, the ester layer is recovered. To this is added ether and the mixture washed with water until free of sulfuric acid, then dried with anhydrous magnesium sulfate. Evaporation of the solvent in vacuo yields the desired product which can be purified by distillation under vacuum at 1 mm. pressure.

EXAMPLE 5

*Preparation of 5-(3-hydroxypropyl)-5H-dibenzo[a,d]-cycloheptene*

A solution of 10 g. of 3-(5-5H-dibenzo[a,d]-cycloheptyl)-propionic acid in 50 ml. of tetrahydrofuran is added dropwise to a solution of 5 g. of lithium aluminumhydride in 50 ml. of tetrahydrofuran and the reaction mixture refluxed for 3 hours. The excess lithium aluminumhydride is decomposed with 25 ml. of ethyl acetate. A saturated aqueous solution of sodium sulfate is added with stirring until two distinct phases develop. At this point, anhydrous sodium sulfate is added and the mixture filtered. Concentration of the solvent yields the desired carbinol.

Following the procedure of Example 5 and employing an equivalent amount of the ethyl ester of 3-(5-5H-dibenzo[a,d]cycloheptyl)-propionic acid in place of the free acid, the desired carbinol is similarly obtained.

EXAMPLE 6

*Preparation of 5-(3-methylaminopropyl)-5H-dibenzo[a,d]-cycloheptene*

A solution of 5 g. of 5-(3-hydroxypropyl)-5H-dibenzo[a,d]cycloheptene in 25 ml. of pyridine at 5° C. is treated with 3 ml. of methanesulfonyl chloride and the reaction mixture allowed to stand for 18 hours at 0–5° C. At the conclusion of this period, ice-water is added and the product extracted with chloroform. The chloroform extract is washed successively with dilute hydrochloric acid and 5% aqueous potassium bicarbonate solution. Concentration of the dried ether solution yields the 5-(3-methanesulfonyloxypropyl) - 5H - dibenzo[a,d]cycloheptene. This is dissolved in 50 ml. of benzene and the benzene solution saturated with methylamine at 0–5° C. and heated at 80° C. in an autoclave for 18 hours. At the end of this time, the cooled benzene solution of the reaction product is washed with 5% aqueous potassium bicarbonate solution and the dried benzene solution concentrated to dryness in vacuo yielding the desired compound.

As previously pointed out hereinabove, the 5-(3-methylaminopropyl)-5H-dibenzo[a,d]cycloheptene is useful in the treatment of mental health conditions as it is an antidepressant and serves as a mood elevator or a psychic energizer. For this purpose, the daily dosage is within the range of 5–250 mg., preferably taken in divided amounts over the day.

I claim:

1. A process which comprises reacting 5H-dibenzo-[a,d]cycloheptene with acrylonitrile in the presence of a quaternary ammonium hydroxide and an inert, substantially anhydrous organic solvent to form the compound 3-(5-5H - dibenzo[a,d]cycloheptyl) - propionitrile, then hydrolyzing said compound to form the corresponding propionic acid and reducing said propionic acid to form the compound 5-(3-hydroxypropyl)-5H-dibenzo[a,d]cycloheptene.

2. A process which comprises reacting 5H-dibenzo-[a,d]cycloheptene with acrylonitrile in the presence of a quaternary ammonium hydroxide and an inert, substantially anhydrous organic solvent to form the compound 3-(5-5H-dibenzo[a,d]cycloheptyl)-propionitrile, then hydrolyzing said compound under basic conditions to form the corresponding propionic acid and reducing said propionic acid to form the compound 5-(3-hydroxypropyl)-5H-dibenzo[a,d]cycloheptene.

3. A process which comprises reacting 5H-dibenzo-[a,d]cycloheptene with acrylonitrile in the presence of a quaternary ammonium hydroxide and an inert, substantially anhydrous organic solvent to form the compound 3-(5-5H-dibenzo[a,d]cycloheptyl)-propionitrile, then hydrolyzing said compound under basic conditions to form the corresponding propionic acid, esterifying said acid to form the corresponding lower alkyl ester and reducing said ester to form the compound 5-(3-hydroxypropyl-5H-dibenzo[a,d]cycloheptene.

4. A process for the preparation of 3-(5-5H-dibenzo-[a,d]cycloheptyl)-propionitrile which comprises reacting 5H-dibenzo[a,d]cycloheptene with acrylonitrile in the presence of a quaternary ammonium hydroxide and an inert, substantially anhydrous organic solvent.

5. A process which comprises reacting 5H-dibenzo-[a,d]cycloheptene with acrylonitrile in the presence of a quaternary ammonium hydroxide and an inert, substantially anhydrous organic solvent to form the compound 3-(5-5H - dibenzo[a,d]cycloheptyl) - propionitrile, contacting said compound with a lower alkanol to form the corresponding iminoether, hydrolyzing said iminoether to form the corresponding ester and reducing said ester to form 5-(3-hydroxypropyl)-5H - dibenzo[a,d]cycloheptene.

6. 3-(5-5H-dibenzo[a,d]cycloheptyl)-propionitrile.

7. 3-(5-5H-dibenzo[a,d]cycloheptyl)-propionic acid.

8. A 3-(5-5H-dibenzo[a,d]cycloheptyl)-propionic acid lower alkyl ester.

References Cited by the Examiner

UNITED STATES PATENTS

| | | | |
|---|---|---|---|
| 2,151,517 | 3/1939 | Kamlet | 260—618 |
| 2,185,141 | 12/1939 | Britton et al. | 260—618 |
| 2,607,794 | 8/1952 | Chamberlin et al. | 260—465 |
| 2,610,979 | 9/1952 | Schenck | 260—465 |
| 2,642,455 | 6/1953 | Bruins et al. | 260—469 |
| 2,726,262 | 12/1955 | Grosskinsky et al. | 260—515 |
| 2,748,162 | 5/1956 | Head et al. | 260—515 |
| 2,788,365 | 4/1957 | Cusic et al. | 260—469 |

(Other references on following page)

OTHER REFERENCES

Treibs et al.: "Berichte," vol. 83, pp. 367–71 (1950).

Schmidlin et al.: Chem. Abstracts, 1909, vol. 3, pp. 2557–2558.

Bruson: "J. Am. Chem. Soc.," vol. 64, pp. 2457–61 (1942).

Dvorken et al.: Journal of American Chem. Society, 1958, pp. 486–487.

Muth et al.: Journal of American Chem. Society, 1955, vol. 77, pp. 3393–3395.

Brewster: "Organic Chemistry," p. 285 (1953).

Morrison et al.: "Organic Chemistry," pp. 441, 445, 446, and 485 (1959).

Wagner et al.: "Synthetic Organic Chemistry," p. 634 (1953).

LEON ZITVER, *Primary Examiner.*

CHARLES B. PARKER, *Examiner.*

D. R. MAHANAND, T. G. DILLAHUNTY,
*Assistant Examiners.*